Dec. 11, 1956  G. W. KELLY  2,773,284
DIE CONSTRUCTION FOR PRESSURE INJECTION MOLDING MACHINES
Filed March 13, 1953

INVENTOR
GEORGE W. KELLY
BY W. S. McDowell
ATTORNEY

United States Patent Office 2,773,284
Patented Dec. 11, 1956

2,773,284

DIE CONSTRUCTION FOR PRESSURE INJECTION MOLDING MACHINES

George W. Kelly, Columbus, Ohio, assignor to Columbus Plastic Products, Inc., Columbus, Ohio, a corporation of Ohio Application March 13, 1953, Serial No. 342,169

2 Claims. (Cl. 18—30)

This invention relates to apparatus for machine-molding relatively thin-walled hollow articles, particularly articles of synthetic resin composition.

My co-pending application, Serial No. 261,871, filed December 15, 1951, of which this application is a continuation in part, discloses certain improvements in die construction for injection-type molding machines. In the construction, sprue passages, employed in transmitting heated plastic material in a mobile condition and under ram-imparted pressures through the dies, are equipped with valve means so disposed and operated as to arrest the flow of the plastic material into the molding cavities of the die construction. The construction functions in a manner precluding the formation on articles molded by the apparatus of sprue runners or other attached extensions of the molding material which require removal from the molded articles before the same can be sold. Such runnerless machine-molded articles are produced through the use of my aforesaid apparatus primarily by providing each molding cavity of the die construction with a resin-admitting gate orifice. Each of these orifices is disposed at the cavity-communicating end of an associated sprue passage. Further, each orifice is opened or closed for resin flow by the provision of a slidable plunger or valve, which, when in its position of orifice closure, forms, in effect, a part of the molding cavity, so that when the die construction is opened, following the formation of articles therein, each of the articles will be devoid of the customary runner appendages present on products molded in conventionally formed dies. The removal of these appendages or runner extensions is costly and laborious and often results in breakage and damage to the finished ware, rendering it unsuitable for commerce.

In the apparatus disclosed in my aforesaid application, the orifice-closing valve pins are actuated by the employment of reciprocating bar devices disposed in perpendicular relation to said valves and having inclined or wedge-shaped surfaces which coact with the valve pins to impart orifice-opening and closing movement thereto upon predetermined sliding movement of the bar devices. Such valve-pin operating mechanism has not proved altogether satisfactory in use and it is one of the principal objects of the present invention to provide a more positive, reliable and structurally simplified mechanism for imparting sliding orifice-opening and closing movement to said valve pins.

For a further understanding of the invention, reference may be had to the following detailed description of a preferred form thereof and the accompanying drawings illustrating the same, and wherein.

Figure 1:
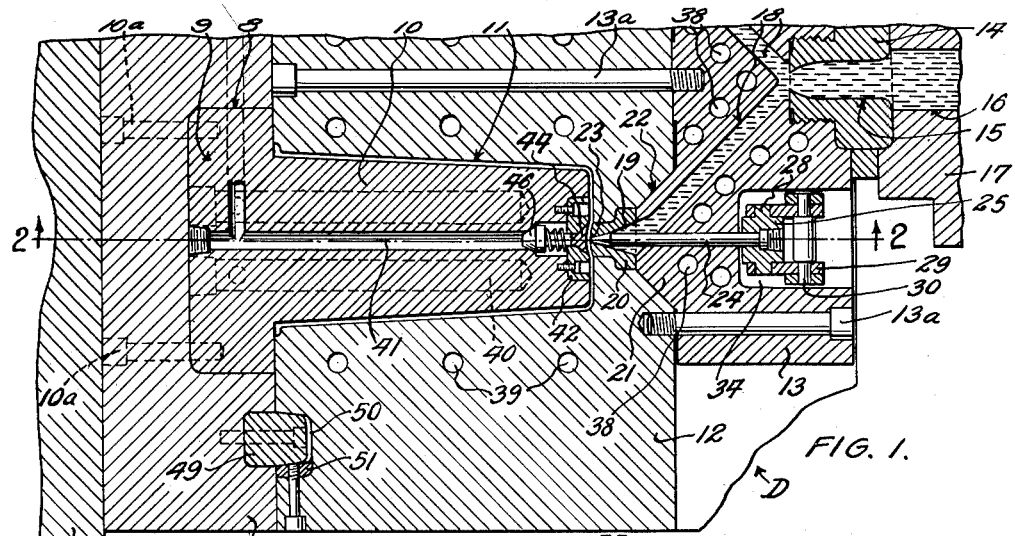
Fig. 1 is a horizontal sectional view taken through the die molds of a pressure injection molding machine in which is incorporated the improved valve mechanism of the present invention.

Referring more particularly to the drawings, there has been shown at 5 the longitudinally slidable bed-supported head of the type employed in conventional injection-type molding presses. Clamped as at 6, or otherwise detachably carried by the head 5, is the core section 7 of a die assembly D. The core section is shown in the drawings as having its outer face socketed at 8 for the reception of the relatively enlarged base portion 9 of a horizontally and longitudinally disposed tapered core extension 10, there being normally a plurality of such extensions provided in relatively spaced order on each core section. Screws 10a may be used to secure the base 9 in the sockets 8.

The tapering extensions 10 are, through movement of the head 5, adapted to be positioned in or withdrawn from complemental molding cavities 11 formed in the stationary bed-mounted cavity or mold section 12 of the die assembly. Each of the cavities 11 possesses the general tapering configuration of the core section extension positioned therein, except that the cavity is slightly larger to provide a space for the reception of the heated plastic molding materials, whereby to form the wall structures of the hollow plastic articles which are adapted to be molded in the die assembly.

Such heated plastic materials are introduced into the molding cavities by entering their closed or base ends. The introduction is accomplished in this instance by providing in conjunction with the cavity section 12 an associated relatively separable but stationary sprue section 13. The sections 12 and 13 are formed with flat interengaging faces held together by bolts 13a. The section 13 comprises preferably a circular plate-like body, bolted as at 13a to the cavity section, which is formed axially and rearwardly thereof with a threaded socket for the reception of a shouldered bushing 14. This bushing is formed with an axial passage 15 which is somewhat restricted at its forward end, while the rear portion of the passage is arranged in open communication with a ram passage 16 formed in the discharge end of an associated stationary ram cylinder 17. Through the operation of a power driven sliding ram (not shown) arranged in the cylinder 17, plastic material in a heated mobile condition is forced through the communicating axially disposed passages 16 and 15 and thence through a plurality of forwardly and outwardly diverging branches or channels 18 provided in the sprue section 13, the channels having a confluent region of registry with the forward end of the plug passage 15.

The forward relatively spaced outer ends of the channels 18 each terminate in registry with a forwardly tapering, substantially conical, valve-seating passage 19, the latter being formed in each of a plurality of annularly shouldered plugs 20 tightly fitted in receiving sockets therefor provided in the rear face of the cavity section 12. In producing this arrangement of parts, I have found it advantageous to form the forward face of the sprue section with frusto-conical bosses 21 which are snugly received in correspondingly formed pockets 22 provided in the mating rear face of the cavity section 12.

When the plug passages 19 are open the plastic material advances under ram pressures therethrough and enters the cavities 11, when the latter are fully occupied by the core extensions 10, through the reduced gate or discharge orifices 23, thereby filling the molding cavities to a maximum extent with the plastic material in the formation of plastic articles. After the cavities have been so filled, each of the orifices 23 is closed by tight engagement of the wall surfaces thereof with those found on the tapered forward end of a sliding sprue cut-off or valve pin 24.

Figure 2:
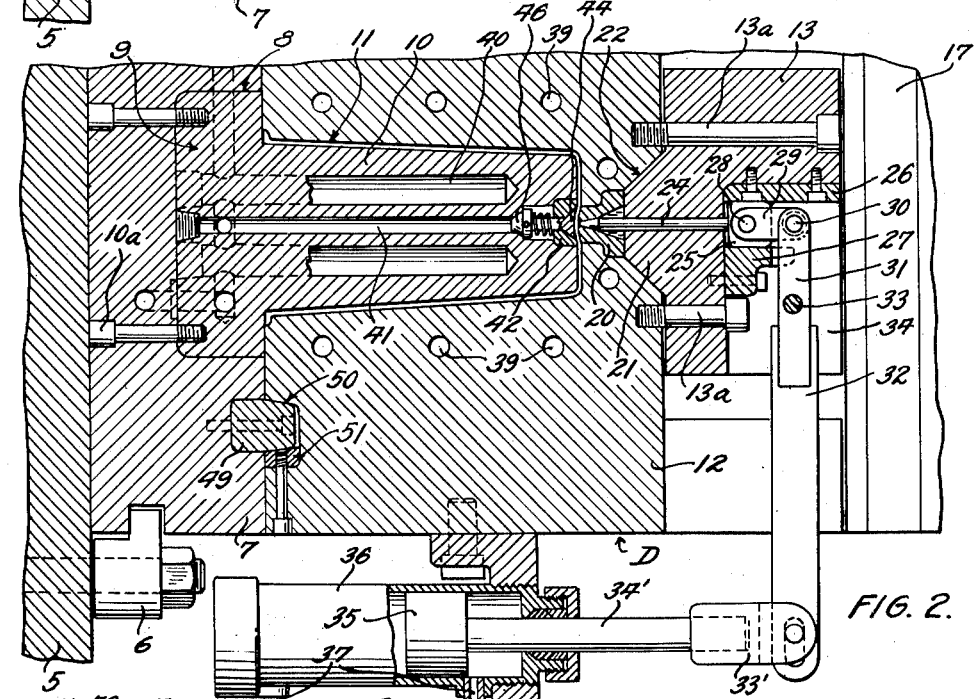
Fig. 2 is a vertical longitudinal sectional view taken on the plane indicated by the line 2—2 of Fig. 1.
Figure 3:
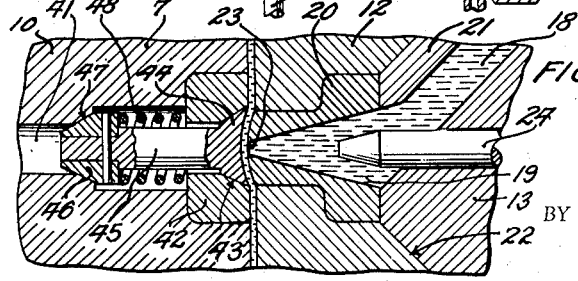
Fig. 3 is an enlarged detail horizontal sectional view disclosing a valve-pin controlled gate orifice formed in accordance with the present invention, and employed for conducting heated plastic material in a mobile state to an associated molding cavity.

It will be noted that when each valve pin is seated, as shown in Figs. 1 and 2, to arrest plastic flow, the outer end thereof is disposed so that in effect it forms a minute part of the wall structure of each molding cavity. This is done, as is set forth in my afore-mentioned prior copending application, in order to prevent the formation on the articles molded in the machine of integral sprue runner extensions which are required in the usual types of injection molding machines to be broken off, or otherwise removed, to produce finished, commercial articles.

To impart sliding movement to the valve pins, there is provided, in accordance with the present invention, on the rear end of each pin a circular head which is received in a socket therefor provided in a sliding block 25. Each block is confined for linear sliding movement in a guideway formed between spaced upper and lower guide members 26 and 27, respectively, carried by the rear portion of the sprue section 13, as shown in Fig. 2. Pivotally connected as at 28 to the block 25 are the forward ends of a pair of links 29, the latter, in turn, having their rear ends pivotally joined as at 30 to the yoke-shaped upper part 31 of a valve pin actuating lever 32. This lever is mounted for rocking movement on a stud shaft 33 which is supported in connection with the walls of a recess 34 formed in the back of the sprue section 13. The lower end of the lever 32 is provided with an elongated slot in which is received a cross pin provided on the bifurcated outer end 33' of a piston rod 34'. The inner end of this rod is connected with a fluid actuated piston 35 slidable in a stationary cylinder 36 carried by the bottom of the cavity section 12 .

The admission of a working fluid under pressure into one end or the other of the cylinder 36, through the fluid inlet and outlet connections shown at 37, and preferably in the automatically timed manner set forth in my above-recited prior application, produces reciprocation of the piston 35. Such reciprocation causes rocking movement of the lever 32 which, through the links 29 at the upper end of the lever, imparts controlled sliding movement to the valve pin or pins associated therewith to open or close the orifices 23 in filling the molding cavities with the plastic material.

The sprue section is preferably formed with the cored openings shown at 38 to provide for the circulation of steam, or other heated fluids, through the sprue section to maintain the plastic material contained in the passages 18 at temperatures providing for the free flowing thereof under ram pressures. The cavity section 12 may be provided with cored passages 39 for the circulation of either heating or cooling fluids, the cooling fluids being employed to hasten the setting or hardening of the plastic articles and to minimize the time of dwell thereof in the machine. Similar passages 40 may be formed longitudinally in the core extensions 10.

In addition the passages 40, each core extension is formed with an axially disposed longitudinally extending passage 41. The rear end of this passage is enlarged and provided with a disk 42 formed with an axial valve-seating opening 43. Normally closing the seating portion of this opening is a valve 44 formed with a stem 45. The forward end of this stem carries a tapered valve head 46 which engages a seat 47 formed with the passage 41, there being a coil spring 48 arranged between the head 46 and the disk 42, which spring normally maintains both valve formations 44 and 46 in their seated positions. It will be seen that fluid under pressure admitted into the passage 41 through its forward end will force the stem and its valves 44 and 46 rearwardly against the force of the spring 48, whereby through the unseating of the end 44 to utilize the movement thereof to break the seal between newly formed articles and the surfaces of the core extensions 10 on which the articles are seated, thus facilitating hand-performed removal of finished articles from the machine when the core section 7 is withdrawn from the cavity section 12. If desired, the rear cavity-section engaging face of the core section 7 may carry a positioning ring 49 having annularly tapered outer surfaces which are adapted to be seated in an annular groove 50 formed in the forward complemental face of the cavity section 12, whereby to provide proper registry of the outer wall surfaces of the core extensions 10 with the complementary surfaces of the cavities 11. The groove 50 may be fitted with a removable wear ring 51.

In view of the foregoing, it will be seen that the present invention provides an improved die construction for injection molding machines which functions to produce finished plastic articles upon which no hand-performed finishing operations need to be done before such articles are suitable for commercial distribution. Hitherto there has been considerable loss to manufacturers of such products produced as a result of the breaking of the ware in the process of removing sprue runners. By this apparatus such runners are not formed, since the sprue passage-closing valves 24 terminate flush with the side walls of the molding cavities. Another advantage in the construction disclosed is the fact that the diameters of the gate orifices 23 may be greater than those heretofore employed. With the use of conventional apparatus in which sprue runners are attached to the molded articles, it is important to reduce the diameter of the gate orifices as much as practicable so that the operation of breaking the attached runners from the ware will be facilitated. Orifices of small diameter slow down the operational timing of such machines and tend to produce walls in which undesired voids or cells are present, this being another condition conducive to the production of rejectable ware. By the valve construction set forth much larger orifices are made feasible, and advantages obtained in shortening the time period required in a complete cycle of article formation, as well as obtaining greater uniformity in the density of the article walls. The apparatus is simple in its structural organization; and may be readily adapted to adjustment, part replacement and die section interchange for the molding of a wide variety of plastic products.

I claim:

1. In an injection molding machine; a die having a molding surface and passage means through which plastic materials may be forcibly passed to said molding surface; said passage means terminating in a discharge orifice at said molding surface and embodying a plurality of relatively angularly disposed branches; injection means for forcing plastic material through said passage means toward the discharge orifice thereof; a sprue cut-off pin movably mounted in said die in axially spaced relation to said injection means and having an outer end, said pin normally extending into said passage means in axial alignment with but in spaced relation to the discharge orifice thereof; means independent of said injection means for moving said pin in the general direction of flow of plastic material toward said discharge orifice and to a position at which said pin closes the orifice of said passage means and is disposed in substantially flush relation to said molding surface; said pin-moving means embodying a lever pivotally mounted on said die and connected at one end with said sprue cut-off pin for moving the same between positions of orifice opening and closure; a cylinder mounted on and disposed exteriorly of said die; a fluid-actuated piston slidably mounted in said cylinder, said piston carrying a rigid rod that extends exteriorly of the cylinder; and means articulately joining the rod at its outer end with said lever.

2. In an injection molding machine; a die having a molding surface and passage means composed of a plurality of angularly related branches and terminating at one end in a relatively restricted discharge orifice opening at said molding surface; injection means communicating with said passage means at the end thereof opposite said discharge orifice and operative to force plastic material through said passage means toward the discharge orifice thereof; an elongated sprue cut-off pin movably mounted in said die in axially offset relation to said injection means and having an outer end portion intersecting said passage means and normally occupying a first position in axially aligned but spaced relation to said discharge orifice, said pin being movable within said die in the direction of flow of plastic material toward said discharge orifice to a second position at which the outer end of said pin closes said discharge orifice and is disposed in substantially flush relation to the molding surface of said die; means independent of said injection means for moving said pin between said first and second positions; said last-named means embodying a block slidably mounted in guides provided on said die; a lever pivotally mounted intermediate the length thereof on said die, said lever extending outwardly and laterally from said die and having an inner end pivotally connected with said block to impart sliding movement thereto and the sprue cut-off pin carried thereby; a cylinder provided on said die; a fluid-actuated piston slidably mounted in said cylinder, said piston carrying a rigid exteriorly projecting rod movable in unison therewith; and means articulately joining the rod at its outer end with said lever.

References Cited in the file of this patent
UNITED STATES PATENTS

| | | |
|---|---|---|
| 1,036,778 | Baker | Aug. 27, 1912 |
| 1,918,532 | Geyer | July 18, 1933 |
| 1,983,602 | Daubenmeyer | Dec. 11, 1934 |
| 2,227,263 | Knowles | Dec. 31, 1940 |
| 2,254,233 | Meyer | Sept. 2, 1941 |
| 2,396,406 | Anderson | Mar. 12, 1946 |
| 2,630,601 | Schiffer et al. | Mar. 10, 1953 |